Oct. 25, 1927.                    T. P. LITTLE                    1,646,967
                                 HOLDING DEVICE
                              Filed Dec. 8, 1922

INVENTOR
Thomas P. Little
BY
ATTORNEY

Patented Oct. 25, 1927.

1,646,967

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

HOLDING DEVICE.

Application filed December 8, 1922. Serial No. 605,623.

The present invention relates to devices for holding a form upon which a tire is to be built up, and has for its object the provision of a device of this character which will be inexpensive in construction, quick in operation, and reliable in use.

The invention will now be described in connection with the accompanying drawings, in which Fig. 1 is a perspective of the device with a tire building form mounted thereon;

Figure 1:
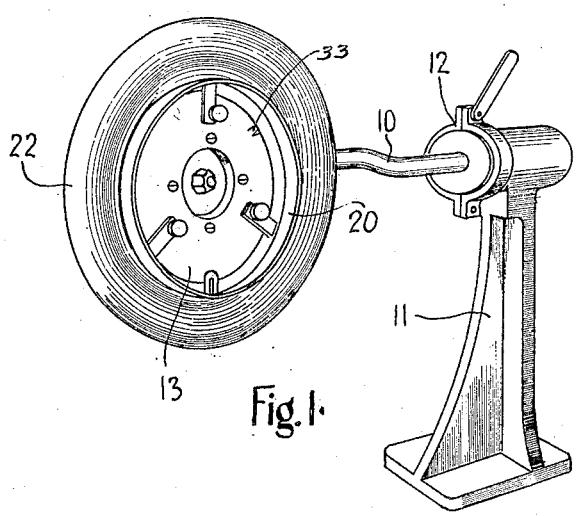

The device is supported upon an arm 10, rotatably mounted in a standard 11 and capable of being held in any desired rotative position by a clamp 12. A disk 13, secured to the arm for rotation thereon in any convenient manner, as on a bearing 14, forms the body of the device. The disk is preferably cut away at its central portion so as to concentrate most of its weight at its outer circumference and produce a fly-wheel effect assisting the operator in keeping up rotation of the building form when this is desired. Attached to the disk, as by screws 16, is a ring 17 presenting a shoulder 18 and an outer fabric-centering and bead-positioning flange 19. This ring 17 is removable to allow for replacement when a change in the type or size of tire is to be made, but for ordinary use on a standard product it remains a fixed part of the device. A second ring 20, similar to the first in all respects except that it is removable in the usual operation and is therefore preferably made of a light material such as aluminum, slides over a ledge 21 on the disk. The shoulders 18 on the two rings unite to form a channel in which rests the neck of a tire building form 22.

Figure 4:
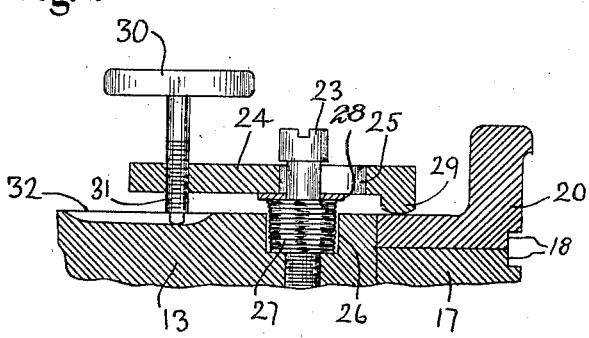
Fig. 4 is a detail.

The clamping mechanism for holding the detachable ring 20 in place is illustrated on a somewhat larger scale in Fig. 4. Three of these clamps are provided, as appears in Figs. 1 and 2. Each clamp comprises a headed stud 23, upon the body of which slides a slotted clamp bar 24. The head of the stud projects over the sides of the slot 25 so that although the bar can be reciprocated to the extent of the slot, it cannot become detached. The stud is screwed into disk 13, a recess 26 around it furnishing a seat for a spring 27 which presses on a washer 28 and holds the bar yieldingly against the head of the stud. To tilt the bar from the normal parallel position in which it is held by the spring, and cause its clamping end 29 to be pressed against the ring 20, a handwheel 30 is provided, having a threaded shank 31 screwed through the bar and adapted to press against the disk 13. A slot 32 in the disk receives the end of the shank and preserves the bar in alignment in all positions.

Figure 2:
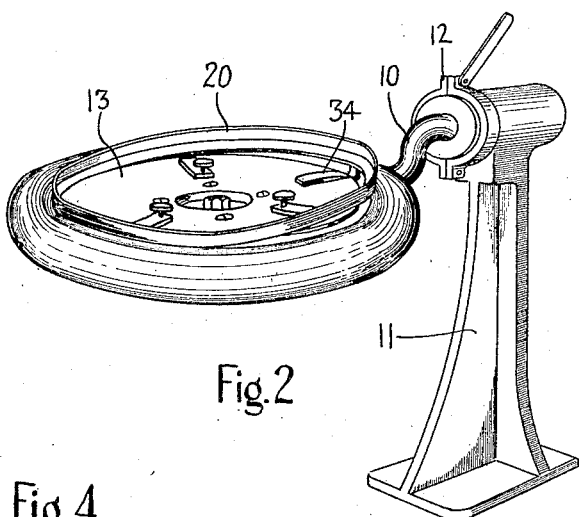
Fig. 2 is a similar view showing the device turned to tire finishing position, and indicating the start of the removal of the form from the device.
Figure 3:
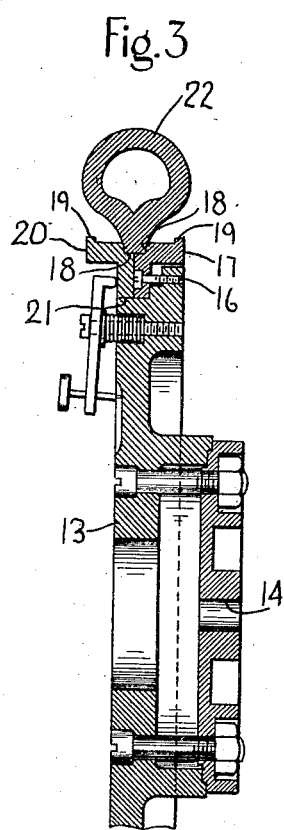
Fig. 3 is a radial section through the holding device.

To operate the clamp to release the ring the handwheel 30 is loosened, permitting the spring to rock the bar so that its clamping end releases its grip on the ring. The clamp can now be backed off or moved inwardly toward the center of the disk 13, so that its outer end clears the inner periphery of ring 20, whereupon the ring can be slid off the supporting ledge 21 without interference. In order to assist in starting the ring from its form-engaging position a beveled slot 33 is cut in the disk 13 at one place adjacent the ring (Fig. 1) into which a screw-driver or small hand prying tool 34 (Fig. 2) may be inserted to pry the ring free. Fig. 2 shows the ring partly removed. After the ring is removed the form 22, with the tire thereon, can be slid off ring 17. With the device swung into horizontal position as in Fig. 2 it serves as a convenient finishing stand upon which the tire may be supported during various finishing operations such as tucking the edges of the material around the beads.

The fabric centering flanges 19 are conveniently arranged to accomplish a double purpose. Their outer peripheries are of a suitable diameter to contact with the edges of those plies which terminate at the bead line, while their inner peripheries serve as guides for the edges of additional plies. The former 22 upon which the tire is built up is preferably the one upon which the tire is vulcanized. For this purpose, in order to permit of internal expansion during vulcanization, the former is preferably constructed as a flexible expansible bag, conveniently made entirely of rubber or other flexible material. A flexible bag of this nature gives more uniform expansion conditions than a bag having a base portion of metal such as shown for example in the English patent to Clark, 21943 of 1906, and the present apparatus is particularly designed for facilitating building operations on such a flexible bag.

Having thus described my invention, I claim:

In an apparatus of the class described, a stand, an arm rotatable in the stand, a disk rotatable on the end of the arm with its axis at ninety degrees from the axis of rotation of the arm, a ring detachably mounted on the outer periphery of the disk, said ring presenting a shoulder to receive the inner periphery of a tire form, a second similar ring fitting upon the disk so as to mate with the first ring and hold the tire form, a series of headed pins around the disk, clamping bars slidable on the pins but restrained by the heads thereof, springs holding the bars yieldably against the end of the pins, and hand screws for tilting the bars with the heads of the pins as fulcrums to hold the second ring in place on the disk.

THOMAS P. LITTLE.